United States Patent
Gosling

(10) Patent No.: US 8,540,514 B2
(45) Date of Patent: Sep. 24, 2013

(54) SYSTEM AND METHOD TO GIVE A TRUE INDICATION OF RESPONDENT SATISFACTION TO AN ELECTRONIC QUESTIONNAIRE SURVEY

(75) Inventor: Martin Miles Gosling, Rodenberg (DE)

(73) Assignee: Martin Gosling, Berlin (DE)

( * ) Notice: Subject to any disclaimer, the term of this patent is extended or adjusted under 35 U.S.C. 154(b) by 2490 days.

(21) Appl. No.: 10/736,100

(22) Filed: Dec. 16, 2003

(65) Prior Publication Data

US 2005/0130110 A1    Jun. 16, 2005

(51) Int. Cl.
*G09B 19/00* (2006.01)

(52) U.S. Cl.
USPC ........... 434/236; 434/238; 434/322; 434/323; 434/350; 434/362; 434/365; 379/92.01; 379/92.02; 379/92.03; 379/92.04; 455/2.01; 705/7.29; 705/7.31; 705/7.32; 705/7.38; 705/7.39; 705/7.41; 705/7.42; 705/12

(58) Field of Classification Search
USPC ................. 434/219, 322, 326, 336, 350, 353, 434/323, 362, 365, 236, 238; 725/9, 13; 379/92.01, 92.02, 92.03, 92.04; 455/2.01; 705/7.29, 7.31, 7.32, 7.38, 7.39, 7.41, 7.42, 705/12
See application file for complete search history.

(56) References Cited

U.S. PATENT DOCUMENTS

| | | | |
|---|---|---|---|
| 5,041,972 A * | 8/1991 | Frost ............................... 705/10 |
| 5,795,155 A * | 8/1998 | Morrel-Samuels ........... 434/107 |
| 5,893,098 A * | 4/1999 | Peters et al. ........................ 1/1 |
| 6,175,833 B1 * | 1/2001 | West et al. .................... 707/661 |
| 6,574,621 B1 * | 6/2003 | Lautzenheiser et al. ............... 1/1 |
| 6,658,391 B1 * | 12/2003 | Williams et al. ............. 705/7.32 |
| 6,728,693 B1 * | 4/2004 | Lautzenheiser et al. ............... 1/1 |
| 6,757,660 B2 * | 6/2004 | Canada et al. ................ 705/7.32 |
| 7,048,544 B2 * | 5/2006 | Olsen ............................ 434/219 |
| 7,054,827 B1 * | 5/2006 | Lautzenheiser et al. ..... 705/7.32 |
| 7,198,490 B1 * | 4/2007 | Olsen ............................ 434/365 |
| 7,769,626 B2 * | 8/2010 | Reynolds ...................... 705/7.32 |
| 2001/0049621 A1 * | 12/2001 | Raposo ............................ 705/10 |
| 2002/0007303 A1 * | 1/2002 | Brookler et al. ................ 705/10 |
| 2002/0035486 A1 * | 3/2002 | Huyn et al. ........................ 705/3 |
| 2002/0052774 A1 * | 5/2002 | Parker et al. ..................... 705/10 |
| 2002/0065709 A1 * | 5/2002 | MacKenzie ...................... 705/10 |
| 2002/0119433 A1 * | 8/2002 | Callender ...................... 434/322 |
| 2002/0128898 A1 * | 9/2002 | Smith et al. ..................... 705/10 |
| 2002/0133502 A1 * | 9/2002 | Rosenthal et al. ......... 707/104.1 |
| 2002/0192629 A1 * | 12/2002 | Shafrir .......................... 434/322 |
| 2003/0061141 A1 * | 3/2003 | D'Alessandro ................. 705/36 |
| 2003/0071852 A1 * | 4/2003 | Stimac .......................... 345/810 |
| 2003/0125610 A1 * | 7/2003 | Sachs et al. ................... 600/300 |
| 2003/0191682 A1 * | 10/2003 | Shepard et al. ................. 705/10 |
| 2004/0018477 A1 * | 1/2004 | Olsen ........................ 434/307 R |

(Continued)

*Primary Examiner* — Jack Yip

(57) ABSTRACT

Whilst partaking in a traditional electronic questionnaire survey, responses given by any one respondent are almost always influenced by that person's emotional state due to the survey format. This emotional content skews the results thus obtained making them inaccurate, so that statistical methods become necessary to interpret the results. Such a statistical analyses requires not only a minimum sample size but also to be interpreted, which can also lead to false, non repeatable results. However, by structuring the system and method of the electronic questionnaire survey in accordance with a strict set of guidelines, it is possible to measure a respondent's views on any subject matter both emotionally and rationally, together with the respondent's level of conviction. By comparing the emotional responses with the rational responses, a truly quantifiable and repeatable measure of respondent satisfaction towards the subject matter can be achieved, which also allows benchmarking as an added benefit.

14 Claims, 11 Drawing Sheets

(56) References Cited

U.S. PATENT DOCUMENTS

| | | | |
|---|---|---|---|
| 2004/0058302 A1* | 3/2004 | Mayer et al. | 434/219 |
| 2005/0071219 A1* | 3/2005 | Kahlert et al. | 705/10 |
| 2005/0075919 A1* | 4/2005 | Kim | 705/10 |
| 2005/0091077 A1* | 4/2005 | Reynolds | 705/1 |
| 2006/0069546 A1* | 3/2006 | Rosser et al. | 704/9 |
| 2006/0155513 A1* | 7/2006 | Mizrahi et al. | 702/179 |

* cited by examiner

2. Product Positioning

| Supplier: | A.N. Other | | Report Date: | 26th November 2003 |

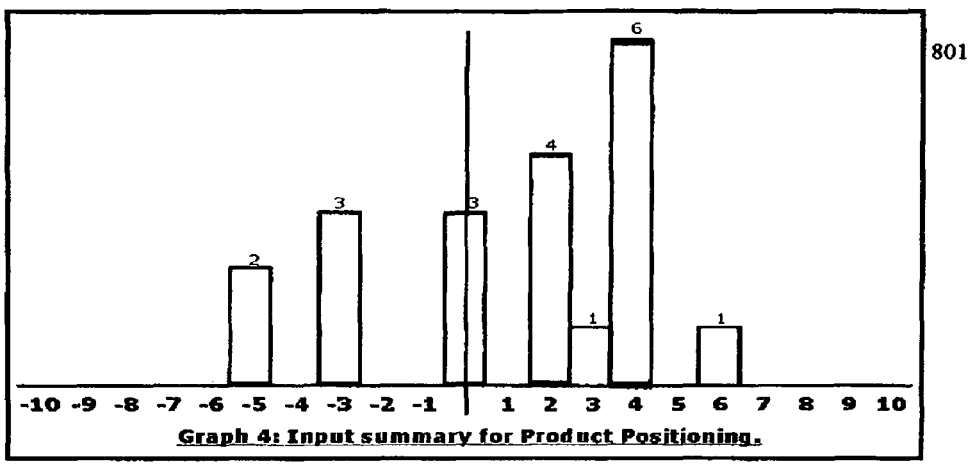

Graph 4: Input summary for Product Positioning.

2.1 Statistical Analysis:

| Mean: | | Standard Deviation: | | Skew: | |
|---|---|---|---|---|---|
| $\dfrac{\sum x}{n}$ | 1.1 | $\sqrt{\dfrac{\sum(x-\bar{x})^2}{n-1}}$ | 3.3 | $\dfrac{(x_{mid}-\bar{x})}{(x_{max}-x_{min})}$ | 8.2% |

- With a mean of 1.1, Product Positioning is a discipline suitably covered by the company, and a standard deviation of 3.3 means that this assessment may be taken as a moderate indicator of the inputs to the survey.
- A skew of 8.2% implies that these results are forecasted to automatically turn more positive, as the inputs were positively weighted about the mean.

2.2 Company Implementation:

| Communication Factor: | Company Strength: | Customer Importance: |
|---|---|---|
| 68.8% | 29.3% | 46.7% |

- With a 68.8% communication factor, customers do not know the company's position towards the area of Product Positioning.
- With a company strength factor of 29.3% and a customer importance factor of 46.7% the company has correctly positioned this discipline, but its importance may still not be fully appreciated by the company as required by the customer base.

Figure 11

SYSTEM AND METHOD TO GIVE A TRUE INDICATION OF RESPONDENT SATISFACTION TO AN ELECTRONIC QUESTIONNAIRE SURVEY

CROSS-REFERENCE TO RELATED APPLICATIONS

This non-provisional utility patent application hereby claims the benefit of the provisional utility patent application 60/431,993 filed on 10$^{th}$ Dec. 2002 with the title "A system and method to give a true indication of respondent satisfaction to an electronic questionnaire survey" on which this current application is based.

DESCRIPTION

A system and method to give a true indication of respondent satisfaction to an electronic questionnaire survey

BACKGROUND OF THE INVENTION

1. Field of the invention

The present invention relates to a system and method to give a true indication of respondent satisfaction to an electronic questionnaire survey from a plurality of respondents. More particularly, but not exclusively, the invention relates to a system and method for companies to accurately measure employee satisfaction and customer satisfaction efficiently and reliably.

2. Description of Related Art

Before the advent of computers, the only way to conduct a questionnaire survey was by using a traditional pen and paper method. This tried and trusted approach asked respondents a number of questions to which the answers could be a simple yes/no, a multiple choice type of response, a multiple selection type of response or a value on a scale (for example ranging from 'I fully agree' through 'I don't have an opinion' to 'I don't agree'). By using various techniques such as repeat questions, it was also possible to qualify the respondent's answers to some extent.

For this type of questionnaire survey, an assessment of the results is typically based upon a statistical analysis of the answers given. Whereas this is a useful tool and much can be read into such a statistical analysis, the actual interpretations of the results can vary, depending on the assessor. Such a system is also open to abuse: the author is aware of situations where such an analysis has been interpreted in order to meet a customer's expectations - something which defeats the whole object (and cost) of the exercise.

The development, deployment, collation and assessment of such pen and paper questionnaire surveys were, and still are, typically highly labour intensive, even for small sample sizes, and as a result expensive.

With the introduction of computers and also Wide Area Networks (WANs) it became possible to harness the computer's power to alleviate some of the manual work in the whole questionnaire survey process by using, as an example, email and/or the internet to distribute and collate questionnaire surveys. Despite being able to simplify certain parts of the questionnaire survey process the process still remained highly labour intensive at the survey creation and survey analysis stages.

As computers became more powerful they also became easier to use (due to a plethora of diverse software being available to simplify the majority of daily tasks across all walks of life) impacting electronic versions of questionnaire surveys also. Not only were Internet based questionnaires becoming easier to manage and thus produce, but also so-called 'kiosk' survey systems were being set up (using dedicated standalone input systems in public places to attract the general public to take part in a survey).

Today there are many diverse applications for generating electronic questionnaire surveys available from the simple questionnaire surveys available free of charge on the Internet through to more complex software product offerings, where techniques such as 'branching' (the questions being asked being dependent on previous answers given) and 'inconsistency testing' (to determine whether questionnaire responses derive from a computer, or from a human not paying attention) are used to qualify the responses obtained.

Despite the large number of alternative choices available today for conducting an electronic questionnaire survey, all require the data to be analysed once the inputs have been collated. Due to the very nature of an electronic questionnaire survey this is almost always based on statistics, requiring interpretation by a human. Herein lies the fundamental problem:

Problem Analysis:

As mentioned previously, one of the main problems with depending on a statistical analysis is that it can be interpreted in numerous different ways, with each way having a different implication. As such, a statistical analysis only becomes useful when conducted more than once and where the trends between each analysis are measured, ensuring each time that the same analysis techniques are used. To get the most out of a questionnaire survey, therefore, requires either running the same questionnaire a number of times over a certain time period and monitoring the trends, or running the same questionnaire survey numerous times in parallel and comparing the results, ensuring each time that exactly the same technique is used to interpret the results.

However, there are several reasons why questionnaire surveys can not be run so frequently: firstly, as has been mentioned before, the costs involved can be prohibitive; secondly, finding people to survey and continue surveying becomes increasingly difficult with time—any 'novelty effect' wearing off very quickly—and using incentive programmes (a technique commonly used to increase the number of willing survey participants) also becomes expensive with time.

A second issue concerning questionnaire surveys specifically designed to measure respondent satisfaction (although not exclusively), is the time factor. Respondent satisfaction is very time dependent—one only has to monitor political opinion poll results to verify this. If a survey takes any length of time to complete, collate and analyse, the results thus obtained may no longer necessarily reflect the sentiments of those respondents at the time of the final result (although they were representative when the questionnaires were complete).

A third issue concerning questionnaire surveys specifically designed to measure respondent satisfaction (although not exclusively), is the fact that such questionnaires are answered emotionally rather than rationally and are therefore unlikely to be a true reflection of respondent satisfaction (emotions, being based on human feelings, are never stable, whereas satisfaction is an average measure of emotions over time). Also, asking a respondent to state their opinion (on which satisfaction is based) in a questionnaire is extremely difficult due to opinions being inherently analogue in nature, and trying to measure an opinion in an analogue fashion (from negative to positive in 10 steps, say) is also difficult to interpret (is the respondent who answers a question requesting an opinion on a subject in hand with −4, for example, really more dissatisfied than a respondent who answers the same question with −2?).

A final issue concerning questionnaire surveys specifically designed to measure respondent satisfaction (although not exclusively), is in summarising the results: If the same question is asked to two different respondents, where the response to be given is based upon a ten step scale (as discussed above) and one answers with +2 and the other with +8, summarising these results would give a value of +5. This may not, however, truly represent the combined feeling of both respondents. If, for example, the respondent with the +8 response was more convinced about their response than the respondent with the +2 response, then a true representation of the summary of these inputs would be expected to be +6 or +7. Such a result can only be obtained in a summary if the 'level of conviction' of the respondent is also taken into account in the results and therefore the end calculation—something which current survey techniques do not accomplish.

BRIEF SUMMARY OF THE INVENTION

From a first perspective of the present invention, a way of presenting a survey questionnaire electronically to a respondent or plurality of respondents is provided so that a respondent is forced to answer the same set of survey questions both emotionally and rationally. The invention also ensures that the resulting responses to both sets of survey questions are given calculated values based upon the respondent's level of conviction. By comparing the results of the emotional and rational responses, a true value of respondent satisfaction can be obtained. This ensures a better quality of data for the statistical analysis stage.

From a second perspective of the present invention, a way of presenting a survey questionnaire electronically to a respondent or plurality of respondents is provided so that a questionnaire is presented, the inputs analysed and an output derived which is both independent of human intervention and therefore repeatable and able to be conducted within a short time frame (typically within a week).

From a third perspective of the present invention, a way of presenting a survey questionnaire electronically to a respondent or plurality of respondents is provided so that the respondent does not feel burdened by partaking in the survey, by ensuring the respondent is able to complete the questionnaire both anonymously and within a short time span (typically less than 5 minutes) and is assured of an assessment of their own inputs immediately following completion of the questionnaire survey.

From a fourth perspective of the present invention, a way is provided to centrally co-ordinate the distribution of questionnaire surveys for a plurality of questionnaire survey originators for those surveys where such a feature would be beneficial, so that not only can the questionnaire survey originator see the results for their own company, but also for their company's entire industry, which, because of the repeatability of the present invention, now becomes possible. The said questionnaire survey originator means the individual or company conducting the questionnaire survey.

BRIEF DESCRIPTION OF THE DRAWINGS

FIG. 11: shows a typical statistical analysis for a Category

DETAILED DESCRIPTION OF AND THE BEST MODE OF CARRYING OUT THE INVENTION

Figure 1:
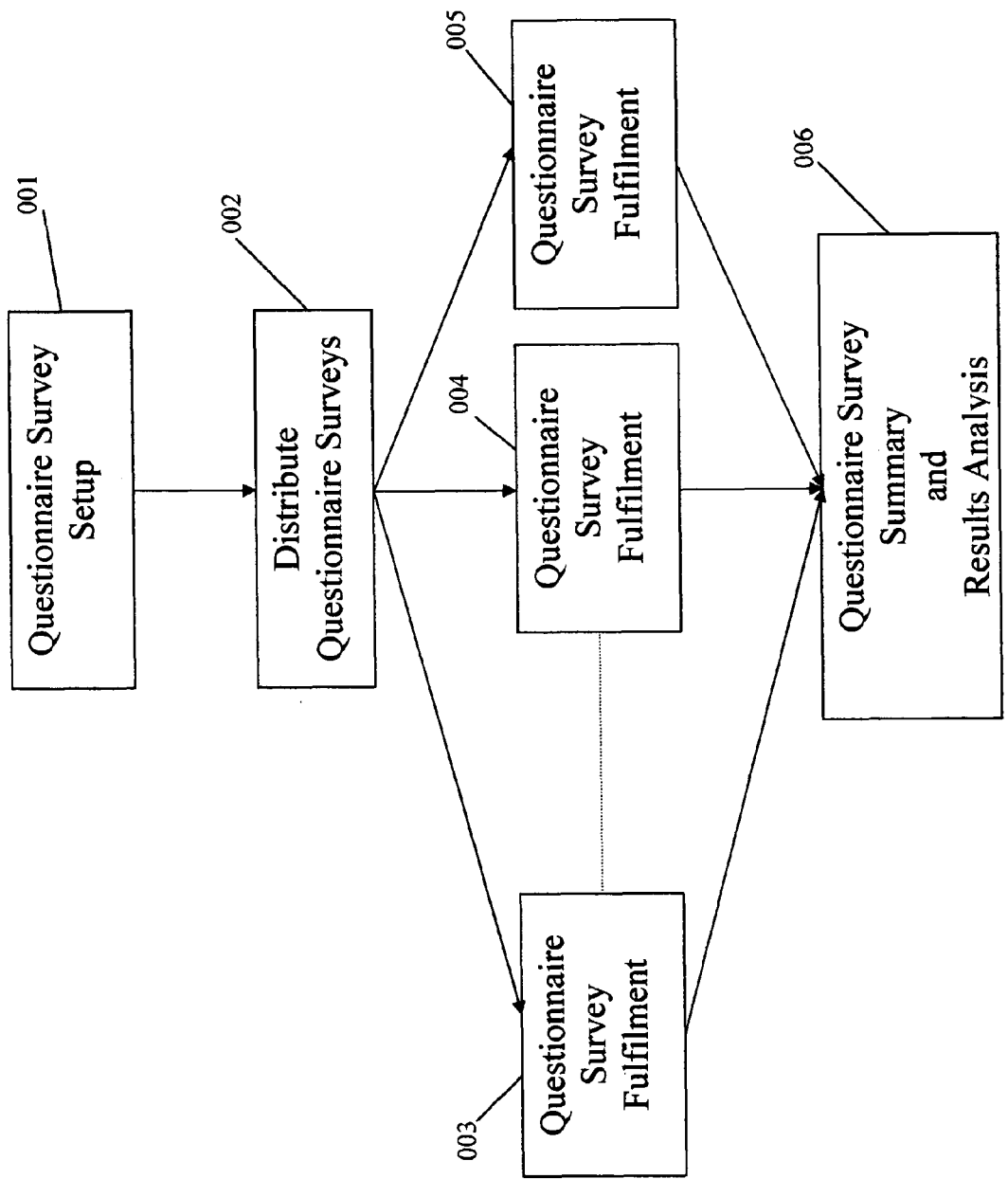
FIG. 1: shows a summary of the entire questionnaire survey process for the present invention

In a preferred embodiment of the present invention a questionnaire survey consists of four distinct phases, summarised in FIG. 1. The questionnaire survey set-up phase (001) defines the questions according to a strict set of guidleines; the distribute questionnaire survey phase (002) selects the best method of distributing the questionnaire survey according to the target respondents' requirements and/or expectations; questionnaire survey fulfilment (003, 004, 005) is where the survey is completed by the respondent or plurality of respondents; the questionnaire survey results analysis phase (006) is where the respondents inputs are statistically analysed and reported.

Figure 2:
FIG. 2: shows a summary of the questionnaire survey set-up stage

Questionnaire Survey Set-Up Phase (001):

In order to measure human satisfaction with the current invention requires the questionnaire to be set-up in accordance to a set of strict rules. The method used for the questionnaire set-up is illustrated in FIG. 2. The first task is to break the survey subject matter down into a number of different ranked Categories (010), with the highest priority category taking first position and assigning a value to each category depending on its position ($C_N$ .. $C_I$, where N indicates the highest rank). As an example, if the survey subject matter were for a Customer Satisfaction Survey, the Categories could be defined and assigned values as follows:

a) Product Positioning—assigned value=4 ($=C_4$)
b) Customer Service—assigned value=3 ($=C_3$)
c) Total Quality—assigned value=2 ($=C_2$)
d) Competitive Positioning—assigned value=1 ($=C_1$)

For the second task, Statement Block 1 is defined (011) whereby in each of the N Categories (N=4 in the above example), n statements are defined (where n=N) ranked and assigned a value depending on their ranking ($C_N Q_n$ .. $C_1 Q_1$ where N and n both indicate the highest rank). As an example, for the Category Product Positioning the four ranked statements could be:

a) We understand fully the product and/or service offerings from the supplier
assigned value=4 ($=C_4 Q_4$)
b) The products and/or services from the supplier add value to our company
assigned value=3 ($=C_4 Q_3$)
c) We are kept up-to-date with new product and/or service offerings from the supplier
assigned value=2 ($=C_4 Q_2$)
d) Our competitors purchase products and/or services from the supplier
assigned value=1 ($=C_4 Q_1$)

For the third task, Statement Block 2 is defined (012) whereby each of the statements in Statement Block 1 are slightly modified, so that they can be used in questions formulated to compare said statements ($C_Xq_x=C_XQ_x$). As an example, the above example statements could be written as follows:
a) we fully understand their products and/or services (=$C_4q_4$)
b) their products and/or services add value to our own products and/or services (=$C_4q_3$)
c) we are regularly updated about their new products and/or services (=$C_4q_2$)
d) they sell products and/or services to our competitors (=$C_4q_1$)

Distribute Questionnaire Survey Phase (002):

The present invention allows the questionnaire survey to be distributed in a number of ways. As an example, but not exclusively, the questionnaire may be distributed for use in a standalone system, as a programme downloaded from a Local Area Network (LAN) e.g. a company intranet and ran on a single system or as a questionnaire survey on a Wide Area Network (WAN) e.g. the World Wide Web (WWW) for completion on a system in a remote location.

Figure 3:
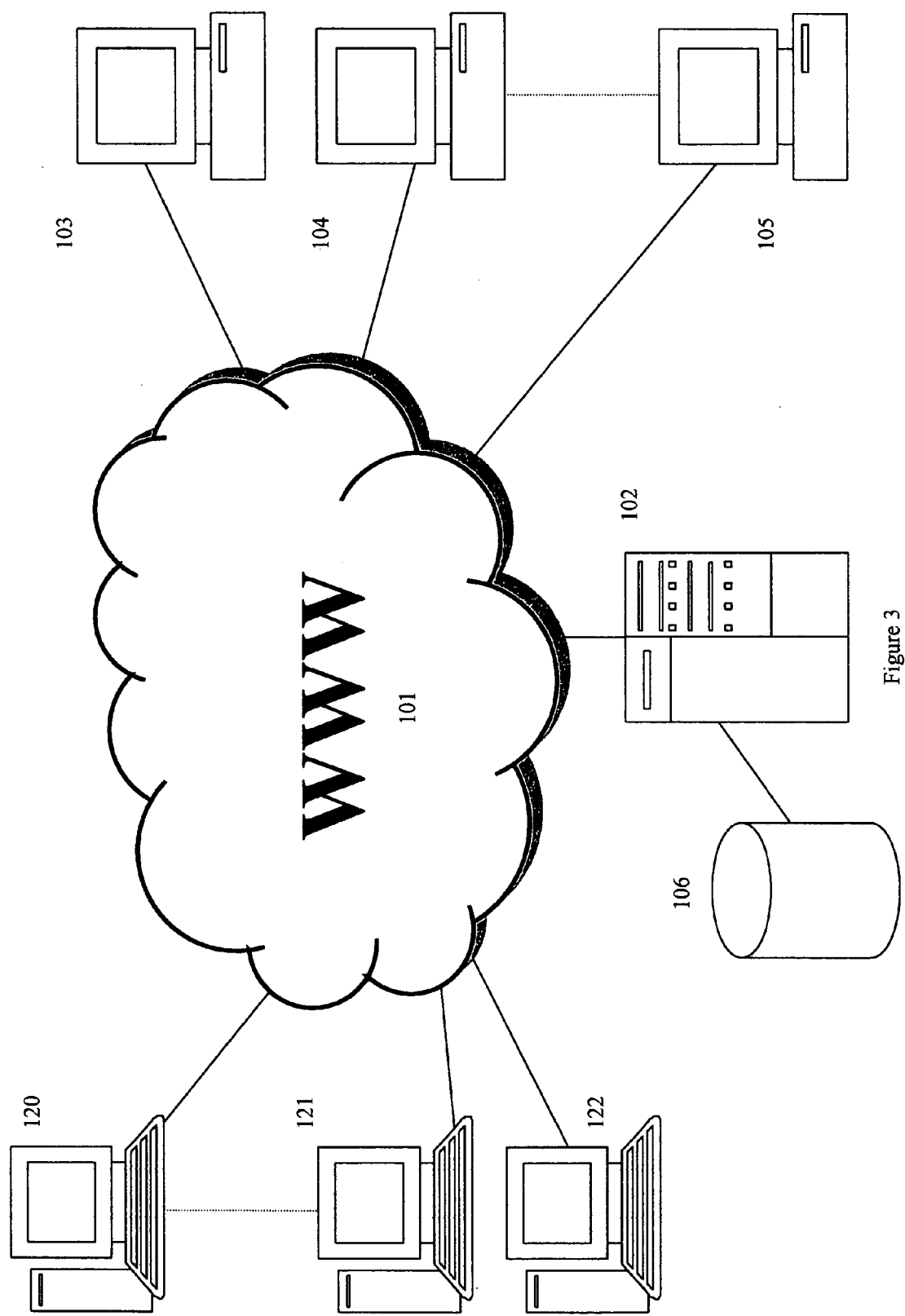
FIG. 3: shows a preferred embodiment of a questionnaire distribution

In a preferred embodiment of the present invention, summarised in FIG. 3, the system advantageously provides a method for questionnaire survey originators (120,121,122) to measure customer satisfaction utilising the World Wide Web (101) as a distribution medium for the questionnaire survey. In the preferred embodiment the questionnaire survey is stored on a single server (102) in HTML (HyperText Markup Language) format, to which all customers being surveyed (103, 104, 105) have access to with a standard internet browser (e.g. Internet Explorer, Netscape, Opera etc.) on their local systems.

Figure 4:
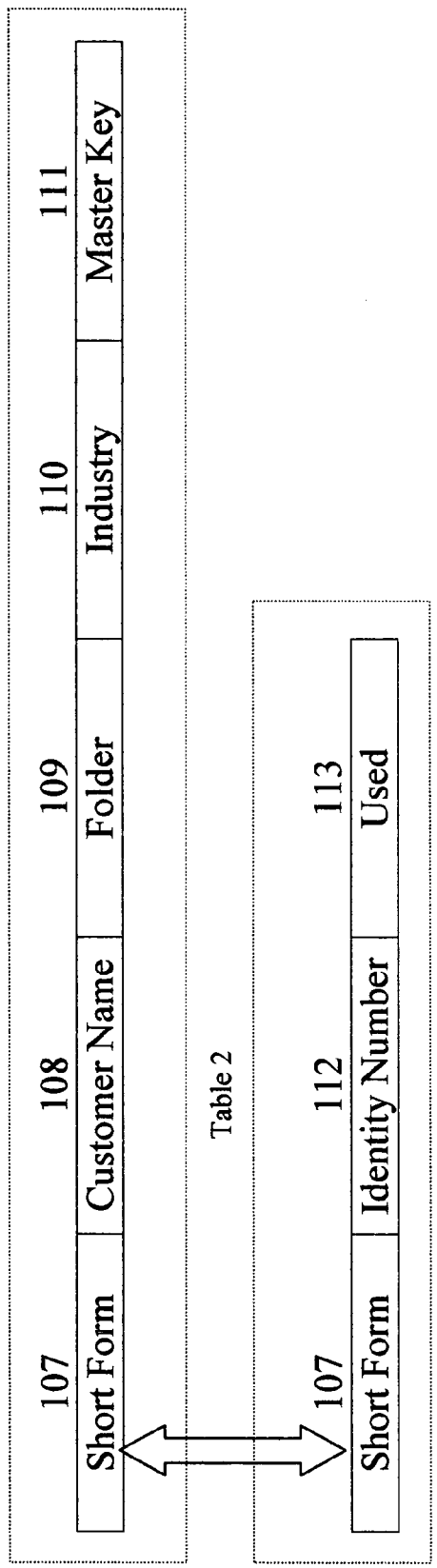
FIG. 4: shows a typical data base entry requirements for a questionnaire survey

In order for the questionnaire survey originator to be able to manage which customers are able to complete the survey, a login procedure is used, whereby the questionnaire survey originator is able to choose the level of anonymity associated with the questionnaire survey. The login procedure requires an identification to be input which singularly identifies the questionnaire survey originator and a password consisting of alphanumerics which can either singularly identify the customer (e.g. by using a customer number), identify that the customer is able to complete the questionnaire survey without identifying the customer as such (e.g. a randomly generated number, distributed randomly and anonymously to the customer) or not identify the customer at all (e.g. using a so called Master Key). These three methods allow the questionnaire survey originator to use a level of anonymity as required by their customers. The identifiers and passwords are stored in a database (106) on the single server (102). In the preferred embodiment, the database contains two linked tables, which are structured as shown (but not exclusively) in FIG. 4. The Shortform (107) is the identification used by the questionnaire survey originator and Customer Name (108) the actual company name of the questionnaire survey originator. Folder (109) is the folder into which the data is to be stored on the server (102) and Industry (110) is an identifier which identifies in which industry the questionnaire survey originator's business is placed (e.g. a Standard Industry Code). Master Key (111) is the generic password which allows a customer to login without being identified. Identity Number (112) is a list of available identity numbers used to validate whether the current customer can partake in the survey. The identity number is either customer specific (e.g. a customer number) or randomly generated at the questionnaire survey set up stage and randomly distributed to the customers who should be partaking in the survey. The Used field (113) is used to check whether the customer has already submitted an input to the questionnaire survey or not (and can therefore be used to prevent multiple entries).

In the preferred embodiment, randomly distributing randomly generated numbers to customers is the preferred password method, as, despite its obvious additional work overhead of physically distributing the passwords, the benefits of providing an anonymous service to customers whilst simultaneously preventing double entries far outweighs the minimal extra overhead.

Figure 5:
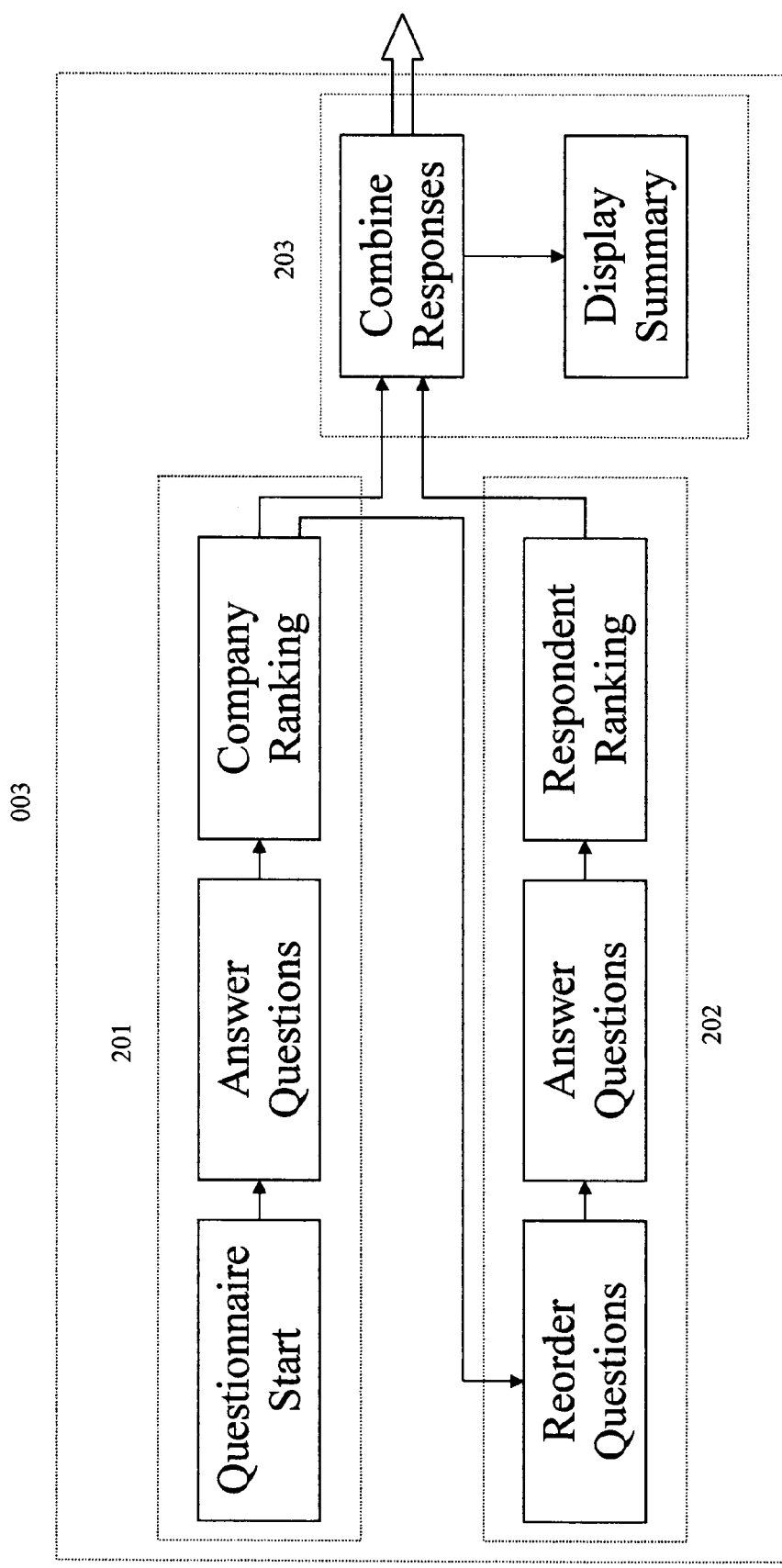
FIG. 5: shows a summary of the questionnaire survey fulfilment stage

Questionnaire Survey Fulfilment Phase (003):

The questionnaire survey fulfilment phase is summarised in FIG. 5 and consists of three discrete blocks: the Company Ranking block (201), the Respondent Ranking block (202) and the Display Summary block (203).

Figure 6:
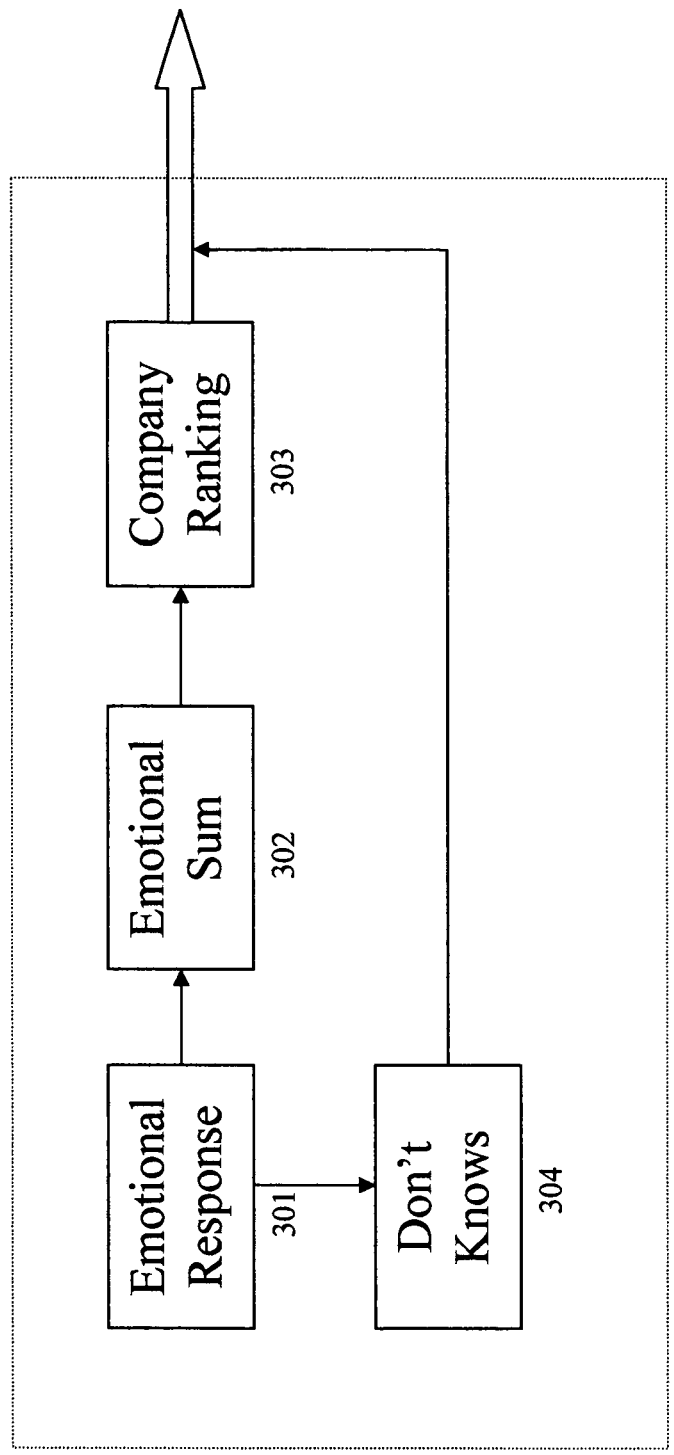
FIG. 6: shows a break down of the Company Ranking stage

The Company Ranking block (201) consists of four stages and is summarised in FIG. 6:

In the Emotional Response stage (301), each statement from Statement Block 1 (011) ($C_XQ_x$) is posed to the respondent as a question, to which the answer can only be "Yes", "No" or "Don't Know" or similar, thereby forcing the respondent to respond emotionally to the questions. As an example, from the previous example, statement $C_4Q_4$ with a question ranked value of 4 could be posed as:

"We understand fully the product and/or service offerings from The Gosling Group
○ I know and agree
○ I know, and don't agree
○ I don't know."

Following the respondent's answer to the question, a positive response (I know and agree) is given a value $V(C_XQ_x)$ of +1, a negative response (I know, and don't agree) a value of -1 and a neutral response (I don't know) a value of 0. This value is then weighted by the statement's ranked value, x ($xV(C_XQ_x)$). In the example above, if the respondent had checked the positive response (I know and agree) the weighted value would equal the statements value of 4 multiplied by +1 (for a positive result)=+4.

In the Emotional Sum stage (302) each Category defined in the questionnaire survey set-up stage (010) is assigned a value equal to the sum of responses per Category from the previous stage (301)

$$(S(C_X)=\sum_{x=1}^{x=n}xV(C_XQ_x),$$

X=N to 1). As an example, let's simply assume that the resulting scores are:

$S(C_4)$=+3 (Product Positioning)
$S(C_3)$=-2 (Customer Service)
$S(C_2)$=+1 (Total Quality)
$S(C_1)$=+1 (Competitive Positioning)

In the Company Ranking stage (303), each Category is ranked according to it's value $S(C_X)$, and given a Company Ranking value ($R(C_X)$) of 1 for the highest rank and N the lowest rank. In the above example, the ranking would therefore be:

1) Product Positioning $R(C_4)$=1 (The Ranking of Category $C_4$=1)
2) Total Quality $R(C_2)$=2
3) Competitive Positioning $R(C_1)$=3
4) Customer Service $R(C_3)$=4

NB for Categories with equal scores, the Category Ranking as defined in the questionnaire survey set-up phase takes precedent, so that in the example above, Total Quality (with a score sum of +1) takes a higher ranking than Competitive Positioning (also with a score sum of +1).

In the Don't Knows stage, all neutral response from the Emotional Response stage (301) are summed to give a "Don't Know" value per Category ($D(C_X)$):

$D(C_4)=1$
$D(C_3)=2$
$D(C_2)=0$
$D(C_1)=1$

Figure 7:
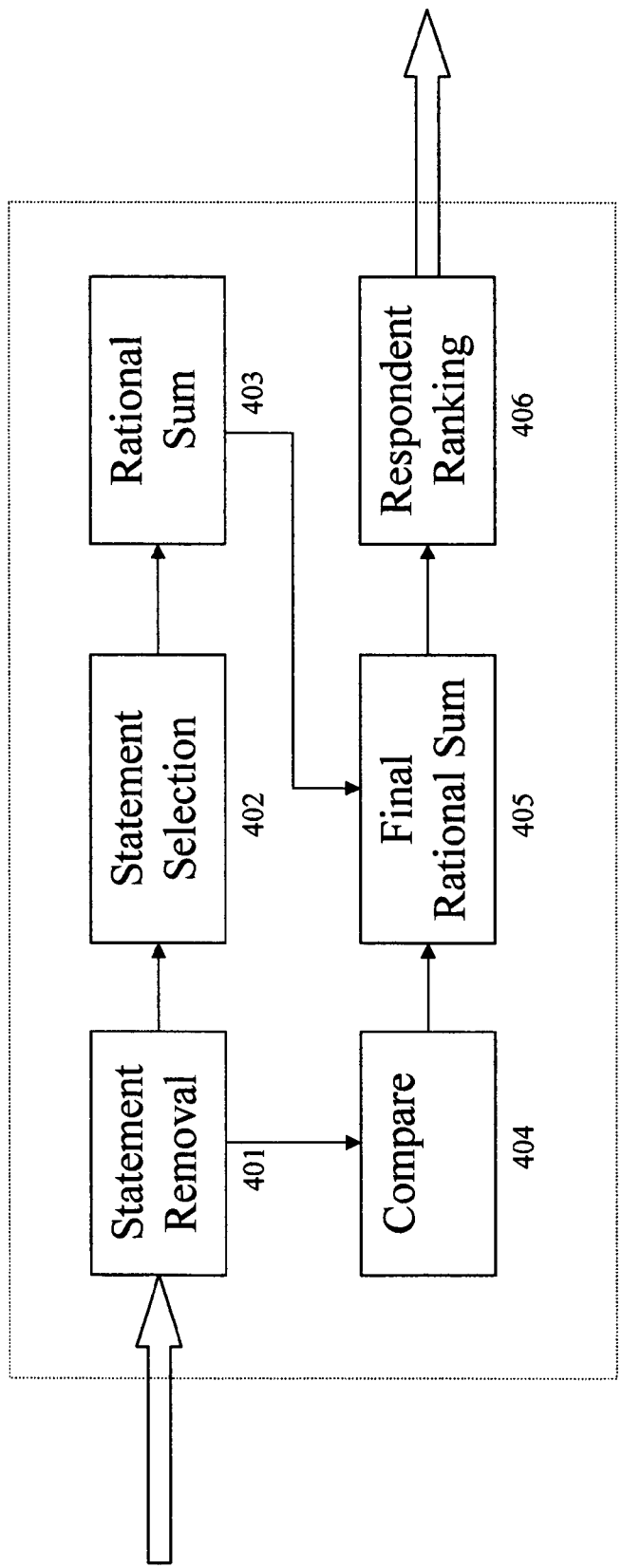
FIG. 7: shows a break down of the Respondent Ranking stage

The Respondent Ranking block (202) consists of six stages and are summarised in FIG. 7:

In the Removal stage (401), statements are removed from Statement Block 2 (012) according to the Company Ranking values $R(C_X)$ allocated during the Company Ranking stage (303). The actual statements removed are $C_X q_{R(C_X)}$, where X=N to 1. In our previous example therefore, for the Category "Product Positioning" where N=4, and the Ranking of Category $C_4$ $R(C_4)=1$, statement $C_4 q_1$ is removed i.e.:

"they sell products and/or services to our competitors".

For the Statement Selection stage (402), all statements with the same ranking value 'r' (r=n to 1) of Statement Block 2 (012) left over following the Statement Removal stage (401) are grouped together into n sets containing (N−1) statements ($C_X q_r$, for X=1 to N and where $C_X q_r$ exists). The respondent is then asked to select the most important statement from each set. The respondent's selected statement is assigned a value ($v(C_X q_r)$) of +1. All other statements in the set are assigned a value of −1.

As an example, the question to select a statement from each set, with $C_1 q_3$ removed, could be posed as:

"Please select one of the statements which most aptly completes the sentence:

I believe it to be most important for a supplier that . . .
○ their products and/or services add value to our own products and/or services ($=C_4 q_3$)
○ we know how their company is structured ($=C_3 q_3$)
○ we know how good the quality of their products and/or services is ($=C_2 q_3$)"

The Rational Sum stage (403) involves giving each Category a value equal to the sum of responses per Category from the Selection stage (402)

$$s(C_X) = \sum_{r=1}^{r=n} v(C_X q_r),$$

X=N to 1. As an example, following the Rational Sum stage (403) the associated values could be:

$S(C_4)=+2$ (Product Positioning)
$S(C_3)=+1$ (Customer Service)
$s(C_2)=+0$ (Total Quality)
$s(C_1)=−1$ (Competitive Positioning)

The Compare stage (404) takes the statements removed at the Removal stage (401) and requests the respondent to rank the statements in order of priority from high to low. The Category given the highest ranking by the respondent is allocated a value $M(C_X)$ of (N−1), the Category given the lowest ranking, a value of 0. All statements in between are valued accordingly. As an example, in order to request the respondent to rank the statements, the question could be posed as:

"Please rank the following statements as they apply to an ideal supplier in order of importance for your company:

1) They sell products and/or services to our competitors ($=C_4 q_1$)
2) All contacts with them are handled quickly and professionally ($=C_3 q_4$)
3) They deliver reliably on time, every time ($=C_2 q_2$)
4) They offer us a fair price for their products and/or services ($=C_1 q_3$)"

Assuming that after the respondent's ranking the order of these statements is as follows:

1) They deliver reliably on time, every time ($=C_2 q_2$)
2) They offer us a fair price for their products and/or services ($=C_1 q_3$)
3) All contacts with them are handled quickly and professionally ($=C_3 q_4$)
4) They sell products and/or services to our competitors ($=C_4 q_1$)

then each category would be allocated the following value $M(C_X)$:

$M(C_2)=+3$
$M(C)=+2$
$M(C_3)=+1$
$M(C_4)=+0$

The Final Rational Sum stage (405) gives a final value $s(C_X)=s(C_X)+M(C_X)$, for X=N to 1. In the above example therefore the values would be:

$s(C_4)=+2+0=+2$
$s(C_3)=+1+1=+2$
$s(C_2)=+0+3=+3$
$s(C_1)=−1+2=+1$

The Respondent Ranking stage (406) then ranks each Category according to it's value $s(C_X)$, and given a Respondent Ranking value ($T(C_X)$) of 1 for the highest rank and N the lowest rank. In the above example, the ranking would therefore be:

1) Total Quality $T(C_2)=1$ (The Ranking of Category $C_2=1$)
2) Product Positioning $T(C_4)=2$
3) Customer Service $T(C_3)=3$
4) Competitive Positioning $T(C_1)=4$ By comparing the said Respondent Ranking (406) (the respondent's rational responses) directly with the Company Ranking from the Customer Ranking stage (303) (the respondent's emotional responses) for closeness of match, a unique value for Respondent Satisfaction to the chosen subject matter can be mathematically calculated. This is achieved by reverse ranking the said Company Ranking positions by assigning a value to the said Company Ranking positions ($A(C_x)$) equal to the difference between each Category's Company Ranking positional value ($R(C_x)$) and the total number of Categories plus I (N+1). In the above example therefore:

$A(C_4)=(4+1)−1=+4$
$A(C_2)=(4+1)−2=+3$
$A(C_1)=(4+1)−3=+2$
$A(C_3)=(4+1)−4=+1$

Each Category is then assigned the reverse ranking value of Respondent Ranking positions ($a(C_x)$) equal to the difference between each Category's Respondent Ranking positional value ($T(C_x)$) and the total number of Categories (N). In the above example therefore:

$a(C_2)=4−1=+3$
$a(C_4)=4−2=+2$
$a(C_3)=4−3=+1$
$a(C_1)=4−4=+0$

The value of Respondent Satisfaction (RS) is then given by $$\sum_{X=1}^{X=N} A(C_X) \cdot a(C_X),$$

and normalised to zero, by subtracting $$\left(\sum_{X=1}^{X=N} X(X-1)\right) / 2.$$

In the above example, therefore, Respondent Satisfaction is given by:

$RS=(2*4)+(1*1)+(3*3)+(0*2)-((4*3)+(3*2)+(2*1)+(1*0))/2$ $RS=18-(20/2)$ $RS=8$

NB This formula for Respondent Satisfaction gives a quantity of 1+

$$\left(\sum_{X=1}^{X=N} X(X-1)\right) / 2$$

values from 0 (worst case) to +

$$\frac{\left(\sum_{X=1}^{X=N} X(X-1)\right)}{2}$$

(best case) i.e. 0 to +10 in the preferred embodiment with N=4.

The Display Summary block (203) outputs a textual summary as well as a graphical report to the respondent, summarising the respondent's satisfaction with the subject matter of the questionnaire survey, immediately following completion of the questionnaire survey.

Figure 8:
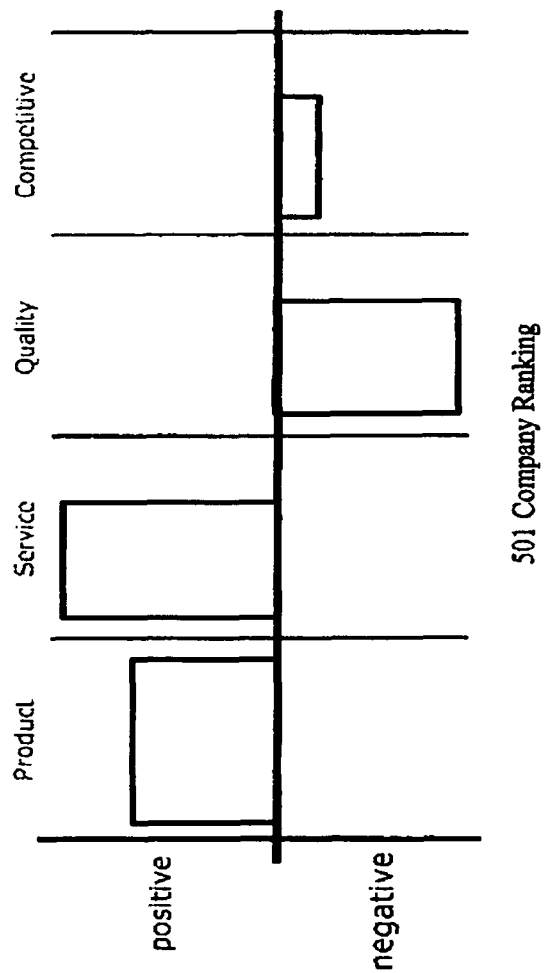
FIG. 8: shows a typical output from the Display Summary stage
Figure 8:
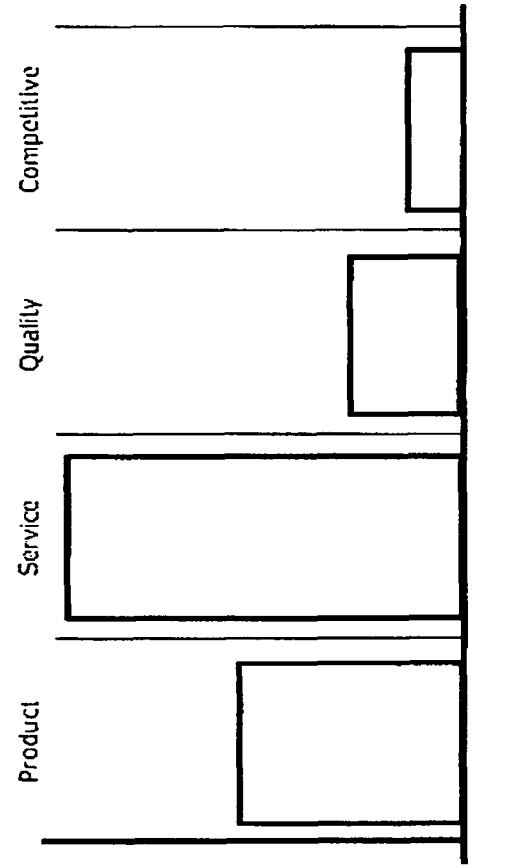

An example of a typical graphical output from the preferred embodiment is shown in FIG. 8. The graph of Company Ranking (501) shows both positive and negative values, and is based upon the results from the Emotional Sum stage (302) and the Don't Knows stage (304) within the Company Ranking block (201). The bar height represents the sum ($S(C_X)$ per Category from the Emotional Sum stage (302); the width of each bar represents the number of statements in Statement Block 1 (011) not answered with a neutral response at the Emotional Response stage (301) ($n-D(C_X)$).

The graph of Respondent Ranking (502) is based on a normalised value of the sum ($s(C_X)$ per Category at the Final Rational Sum stage (405) in the Respondent Ranking block (202). The normalised sum value is calculated by subtracting the largest negative value of the Category sum from each Category sum value and adding 1. For example if the $s(C_X)$ sum results were as follows:

$S(C_4)=+4$
$S(C_3)=-2$
$s(C_2)=+1$
$s(C_1)=-1$ then the largest negative value is $-2$ ($s(C_3)$). Subtracting this value from each of the $s(C_X)$ sums and adding 1 gives:

$S(C_4)=+4-(-2)+1=+7$
$s(C_3)=-2-(-2)+1+1$
$s(C_2)=+1-(-2)+1=+4$
$s(C_1)=-1-(-2)+1=+2$ which would then be used to plot the Respondent Ranking bar graph (502).

In the preferred embodiment, a simple text report is also generated summarising both the Company Rankings and Respondent Rankings of the respondent's inputs and is based on the calculated values of $S(C_X)$, $D(C_X)$ and $s(C_X)$ for each Category.

Figure 9:
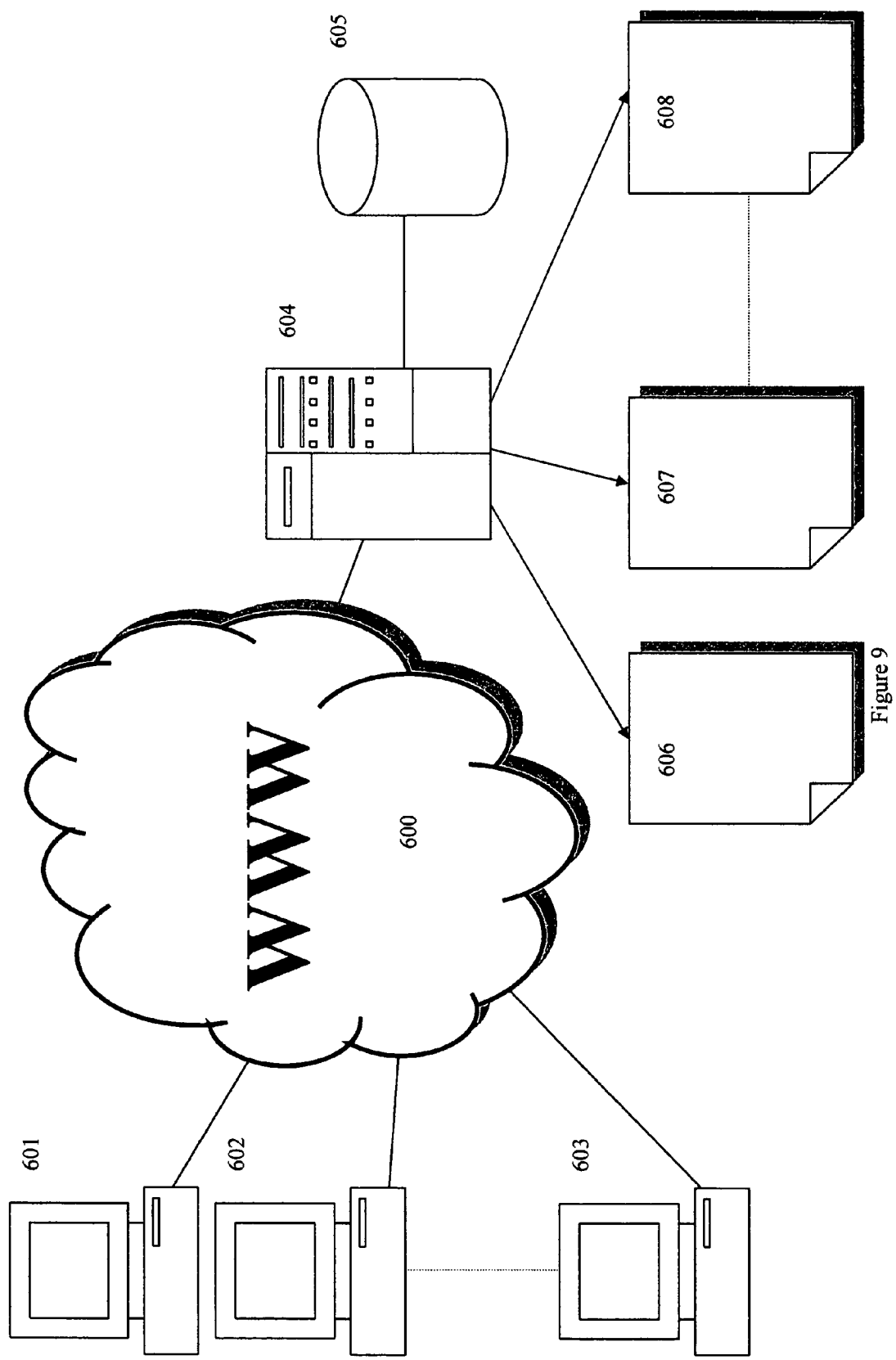
FIG. 9: shows a summary of the questionnaire survey results analysis stage

Questionnaire Survey Results Analysis Phase (006):

The questionnaire survey results analysis phase is summarised in FIG. 9. In the preferred embodiment, the processing unit (604) is a software programme which takes the inputs from a plurality of respondents (601, 602, 603), summarises the results and delivers an Executive Summary (606) and N Category statistical reports, where N equals the number of Categories defined at the Category definition stage (010) at the questionnaire survey set-up phase (001) (607, 608).

In a preferred embodiment, the processing unit (604) is a server attached to the World Wide Web (600) and the inputs for the said processing unit are stored in a database (605) associated with the server.

Figure 10:
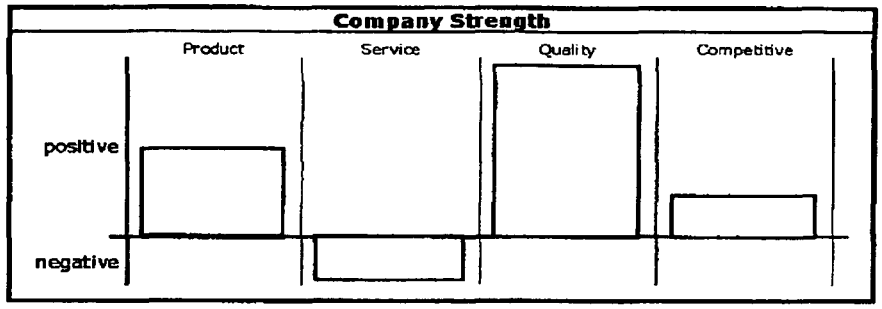
FIG. 10: shows a typical Executive Summary output
Figure 10:
Figure 10:
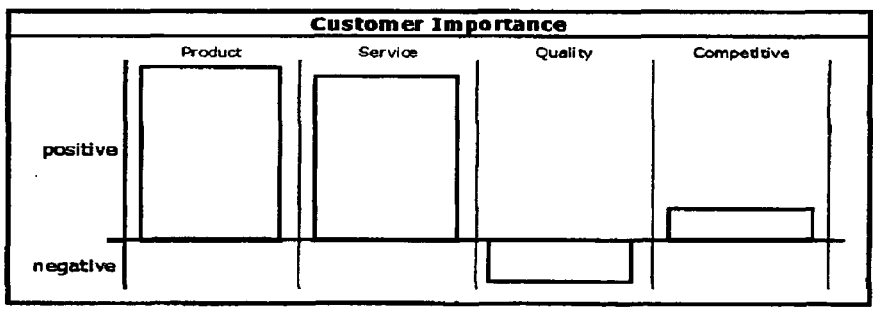
Figure 10:
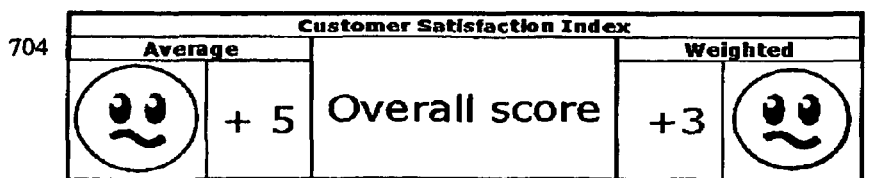

In a preferred embodiment the processing unit (604) takes each of the sums from the Emotional Sum stage (302), the Don't Knows stage (304) and the Final Rational Sum stage (405) from each respondent (601, 602, 603) and stores them in a database (605). The processing unit (604) then uses the information stored in the database (605) summing each of the inputs to produce an Executive Summary report (606). An example of a typical Executive Summary report can be found in FIG. 10. The said Executive Summary report contains a summary for Company Strength (701), which is calculated from the sum of Emotional Sums (302) by using the same procedure as that summarised in the Company Ranking stage (303) of the Company Ranking block (201); a summary for Amount of Uncertainty (702) which is a graphical summary of the number of responses which were "Don't Knows" from the Don't Know stage (304) per Category; a summary of Company Importance (703) which is calculated from the sum of Final Rational Sums (405) by using the same procedure as that summarised in the Respondent Ranking stage (406) of the Respondent Ranking block (202); a summary of Respondent Satisfaction defined as the closeness of match of the respondent's emotional responses and their rational responses to the subject matter of the questionnaire survey, in which both a 'Weighted' value (705) - also known as the respondent's level of conviction in their answers - is calculated by measuring the closeness of match between the sum of Company Strength (701) and the sum of Company Importance (703) for all respondents according to the same methodology summarised in the Respondent Ranking block (202) above and an 'Average' value (704) calculated by mathematically averaging each respondent's value for Respondent Satisfaction according to that summarised in the Respondent Ranking block (202) above, are summarised.

Sum values, with a short textual summary of the results; the Company Implementation (803) is a numerical and textual summary of all respondents' Don't Knows per Category ( $D(C_X)$ ) from the corresponding Don't Knows stage (304) (Communication Factor); together with a summary of all said Emotional Sums $s(C_X)$ from all respondents' Emotional Sum stages (302) (Company Strength) expressed as a normalised percentage of all Emotional Sums from all Categories; and all Rational Sums s($C_X$) from all respondents' Final Rational Sum stages (405) (Company Importance) expressed as a normalised percentage of all Final Rational Sums from all Categories.

Other embodiments not described herein are also within the scope of the following claims.

What is claimed is:

1. A computer implemented method to give an immediate indication of respondent satisfaction to an electronic questionnaire survey, including the steps of:

acquiring the respondent's emotional response further including the steps of:
    defining a fixed number of category groups relevant to the subject matter of said survey by a survey initiator;
    ranking said number of category groups by said survey initiator in order of importance;
    assigning by the computer processor, a category importance value to said category group according to said importance;
    calculating by the computer processor, a quantity of a plurality of statements depending on said number of category groups;
    defining said plurality of statements by said survey initiator, so that said plurality of statements are distributed evenly amongst said category groups;
    ranking said plurality of statements in said category groups by said survey initiator in order of importance;
    assigning by the computer processor, a statement importance value to said statements according to said importance in said category groups;
    generating by the computer processor, said plurality of statements into emotional question form, wherein said emotional question form invokes an emotional response from said respondent by limiting the predetermined response possibilities to "yes", "no", and "don't know";
    assigning by the computer processor, a fixed response value for said predetermined response possibilities;
    presenting said questions to a respondent, on a display of the computer;
    recording by the computer processor, said emotional responses from said respondent to said emotional questions by storing them in the memory of said computer;
    calculating by the computer processor, first category values for said category groups based upon said statement importance value and said response value of said responses using said computer;
    ranking by the computer processor, said category groups into a first ranking order according to said first category values and said category importance value on said computer in real time;

acquiring the respondent's rational response further including the steps of:
    defining by the computer processor, a fixed number of statement groups consisting of at most one statement from each said category group in real time, wherein said statement from each said category group is chosen based upon said first ranking order and said ranking of said plurality of statements in said category groups;
    presenting said plurality of statements in said statement groups in rational question form to said respondent on said display of said computer in real time, wherein said rational question invokes a rational response from said respondent by asking said respondent to rank said plurality of statements in said statement groups according to importance;
    recording by the computer processor, said rational responses from said respondent to said rational questions by storing them in the memory of said computer;
    calculating by the computer processor, a second category value depending solely on said rational responses on said computer in real time;
    ranking by the computer processor, said category groups into a second ranking order according to said second category values on said computer in real time;

calculating value of the respondent's satisfaction and level of conviction further including the steps of:
    defining a respondent's satisfaction value as the closeness of match of said ranking of said category groups from said emotional responses with said ranking of said category groups from said rational responses, wherein an exact match indicates the highest level of respondent satisfaction and the exact opposite indicates the lowest level of satisfaction;
    calculating by the computer processor, a numerical value for said closeness of match of said first ranking order with said second ranking order on said computer in real time;
    defining a respondent's level of conviction as the sum of the absolute category values resulting from said emotional responses and said rational responses, wherein a larger resulting value shows a greater level of conviction than a smaller resulting value;
    calculating by the computer processor, a numerical value for said respondent's level of conviction based upon said first category values and said second category values on said computer in real time;
    presenting said value of said respondent's satisfaction and said value of said respondent's level of conviction to said respondent in real time on said display of said computer.

2. The computer implemented method according to claim 1 of subdividing said subject matter of said questionnaire survey into a number of category groups, where said category groups are ranked according to the importance of said category groups to said subject matter by the survey initiator, where a number of statements is calculated according to a fixed algorithm and where said statements are equally distributed in number amongst said category groups and are themselves ranked within each said category group according to the importance of said statements to said survey initiator.

3. The computer implemented method according to claim 1 of defining statements, where each said statement can be used in questions which are answered with the limited set of predefined answers "yes", "no" or "don't know" and where said statements can be combined and used in questions which requires a choice to be made of said statements.

4. The computer implemented method according to claim 1 of defining said second set of questions programmatically on said computer, where said second set of questions are dynamically created at the time of said questionnaire survey on said computer by grouping together a calculated number of said statements based on said responses to said first set of questions.

5. The computer implemented method according to claim 4 where said second set of questions are defined so that said respondent is forced to respond rationally to said question on said computer at the time of the questionnaire survey.

6. The computer implemented method according to claim 1 of scoring and ranking said responses to said first set of questions programmatically on said computer where said respondent's emotional response has a value calculated programmatically on said computer at the time of said questionnaire survey, where said value represents the level of conviction of said respondent's emotional responses to said questions, which are then ranked programmatically on said computer.

7. The computer implemented method according to claim 1 of scoring and ranking said responses to said second set of questions programmatically on said computer where said respondent's rational response has a value calculated programmatically on said computer at the time of said questionnaire survey, where said value represents the level of conviction of said respondent's rational responses to said questions, which are then ranked programmatically on said computer.

8. The computer implemented method according to claim 1 of comparing said emotional and said rational responses from said respondent programmatically on said computer in which the closeness of match of said ranking of said emotional responses and said ranking of said rational responses is quantifiably measured on said computer, thereby giving a value for respondent satisfaction, wherein an exact match indicates the highest level of respondent satisfaction and the exact opposite indicates the lowest level of satisfaction.

9. A computer implemented method to give an immediate indication of a plurality of respondents' satisfaction to an electronic questionnaire survey, including the steps of:
   acquiring the respondents' emotional response further including the steps of:
      defining a fixed number of category groups relevant to the subject matter of said survey by the survey initiator;
      ranking said number of category groups by said survey initiator in order of importance;
      assigning by the computer processor, a category importance value to said category group according to said importance;
      calculating by the computer processor, the quantity of a plurality of statements depending on said number of category groups;
      defining said plurality of statements by said survey initiator, so that said plurality of statements are distributed evenly amongst said category groups;
      ranking said plurality of statements in said category groups by said survey initiator in order of importance;
      assigning by the computer processor, a statement importance value to said statements according to said importance in said category groups;
      generating by the computer processor, said plurality of statements into emotional question form, wherein said emotional question invokes an emotional response from said respondent by limiting the predetermined response possibilities to "yes", "no", and "don't know";
      assigning by the computer processor, a fixed response value for said predetermined response possibilities;
      presenting said emotional questions on a display of a standalone computer or a plurality of computers on a network, to a plurality of respondents, where said plurality of respondents represent a common collection of people, affected similarly by said subject matter;
      recording by the one or more computer processors, said emotional responses from each of said plurality of respondents to said emotional questions individually by storing them in the memory of said standalone computer or said plurality of computers on a network;
      calculating by the one or more computer processors, first category values for said category groups based upon said statement importance value and said response value of said responses for each said respondent separately using said standalone computer or said plurality of computers on a network;
      ranking by the one or more computer processors, said category groups into a first ranking order according to said first category values and said category importance value on said standalone computer or said plurality of computers on a network in real time for each said respondent separately;
   acquiring the respondents' rational response further including the steps of:
      defining by the one or more computer processors on said standalone computer or said plurality of computers on a network, a fixed number of statement groups for each said respondent separately consisting of at most one statement from each said category group in real time, wherein said statement from each said category group is chosen based upon said first ranking order of each said respondent and said ranking of said plurality of statements in said category groups;
      presenting said plurality of statements in said statement groups in rational question form to each said respondent separately on said display of said standalone computer or said plurality of computers on a network in real time, wherein said rational question invokes a rational response from each said respondent by asking each said respondent to rank said plurality of statements in said statement groups according to importance;
      recording by the one or more computer processors, said rational responses from each said respondent to said rational questions by storing them in the memory of said standalone computer or said plurality of computers on a network;
      calculating by the one or more computer processors, a second category value depending solely on said rational responses on said standalone computer or said plurality of computers on a network in real time for each said respondent separately;
   recording values of said first category values and said second category values of each said respondent into a data file on a standalone central computer or central computer on a network further including the steps of:
      combining by the one or more computer processors, said first category values and said second category values for each respondent into a computer string value on said standalone computer or said plurality of computers in real time;
      appending by the one or more computer processors, said string value into a single computer data file on said central computer in real time;
      calculating by the computer processor, a combined string value for said plurality of respondents by adding each individual numerical part of each said computer string value in said single computer data file on said central computer in real time;
      extracting by the computer processor, combined first category values and combined second category values from said combined string value, representing the combined input of said plurality of respondents, on said central computer in real time;

calculating value of the respondents' satisfaction and conviction further including the steps of:

defining the value of a plurality of respondent's satisfaction as the closeness of match of the ranking of said category groups from said emotional responses for all respondents combined with the ranking of said category groups from said rational responses combined, wherein an exact match indicates the highest level of satisfaction and the exact opposite indicates the lowest level of satisfaction;

ranking by the computer processor, said category groups into a first combined ranking order according to said combined first category values and said category importance value on said central computer in real time;

ranking by the computer processor, said category groups into a second combined ranking order according to said combined second category values on said central computer in real time;

calculating by the computer processor, a numerical value for said closeness of match of said combined first ranking order with said combined second ranking order on said central computer in real time;

defining said plurality of respondent's level of conviction as the sum of the absolute combined first category values resulting from said emotional responses and said rational responses of all respondents, wherein a larger resulting value shows a greater level of conviction than a smaller resulting value;

calculating by the computer processor, a numerical value for said plurality of respondent's level of conviction based upon said combined first category values and said combined second category values on said central computer in real time;

presenting said value of said plurality of respondent's satisfaction and said value of said plurality of respondent's level of conviction to said respondent in real time, on said display of said standalone computer or said plurality of computers on a network;

presenting said value of said plurality of respondent's satisfaction and said value of said plurality of respondent's level of conviction to said survey initiator in real time, on said display of said central computer.

10. The method according to claim 9 of presenting the results from said questionnaire survey both textually and graphically on an output device, so that said respondent sees both a summary of their own results for satisfaction and level of conviction as well as the results of said plurality of respondents immediately at the time of said questionnaire survey, for comparison purposes.

11. The method according to claim 9 of summarizing a single respondent's said responses to said questionnaire survey in a single line of alphanumerical characters, where the said single line of alphanumeric characters can be saved in a text file on said computer at the time of said questionnaire survey.

12. The method according to claim 9 of defining said single line of alphanumeric characters, so that more than one said single line of alphanumeric characters can be added together programmatically on said computer at the time of said questionnaire survey to give a second single line of alphanumeric characters, which represents the combined inputs from said plurality of respondents.

13. A computer implemented method to give an immediate indication of a plurality of respondents' satisfaction to an electronic questionnaire survey and to immediately benchmark the results against a second or more plurality of respondents' satisfaction to an identical electronic questionnaire survey at the time of the survey, including the steps of:

acquiring the respondents' emotional response further including the steps of:

defining a fixed number of category groups relevant to the subject matter of said survey by the survey initiator;

ranking said number of category groups by said survey initiator in order of importance;

assigning by the computer processor, a category importance value to said category group according to said importance;

calculating by the computer processor, the quantity of a plurality of statements depending on said number of category groups;

defining said plurality of statements by said survey initiator, so that said plurality of statements are distributed evenly amongst said category groups;

ranking said plurality of statements in said category groups by said survey initiator in order of importance;

assigning by the one or more computer processors, a statement importance value to said statements according to said importance in said category groups;

generating by the computer processor, said plurality of statements into emotional question form, wherein said emotional question invokes an emotional response from said respondents by limiting the predetermined response possibilities to "yes", "no", and "don't know";

assigning by the computer processor, a fixed response value for said predetermined response possibilities;

presenting said emotional questions on a display of a standalone computer or a plurality computers on a network to an entity, consisting of a collection of a plurality of respondents, where each said collection represents a common collection of people affected similarly by said subject matter;

recording by the one or more computer processors, said emotional responses from each respondent of said plurality of respondents to said emotional questions individually by storing them in the memory of said standalone computer or said plurality of computers on a network;

calculating by the one or more computer processors, first category values for said category groups based upon said statement importance value and said response value of said responses for each said respondent in each said collection separately using said standalone computer or said plurality of computers on a network;

ranking by the one or more computer processors, said category groups into a first ranking order according to said first category values and said category importance value on said computer in real time for each said respondent in each said collection separately;

acquiring the respondents' rational response further including the steps of:

defining by the one or more computer processors on said standalone computer or said plurality of computers on a network, a fixed number of statement groups for each said respondent in each said collection separately consisting of at most one said statement from each said category group in real time, wherein said statement from each said category group is chosen based upon said first ranking order of each said respondent and said ranking of said plurality of statements in said category groups;

presenting said plurality of statements in said statement groups in rational question form to each said respondent in each said collection separately on said display of said computer in real time, wherein said rational question invokes a rational response from each said respondent by asking each said respondent to rank said plurality of statements in said statement groups according to importance;

recording by the one or more computer processors, said rational responses from each said respondent in each said collection separately to said rational questions by storing them in the memory of said standalone computer or said plurality of computers on a network;

calculating by the one or more computer processors, a second category value depending solely on said rational responses on said computer in real time for each said respondent in each said collection separately;

recording said first category values and said second category values of each said respondent for each said collection and for all said collections combined into two distinct data files on a standalone central computer or central computer on a network further including the steps of:

combining by the one or more computer processors, said first category values and said second category values for each respondent in each collection into a computer string value on said standalone computer or said plurality of computers in real time;

appending by the one or more computer processors, said string value into a single computer data file for each said collection on said central computer in real time;

calculating by the one or more computer processors, a combined string value for said plurality of respondents by adding each individual numerical part of each said computer string value in said single computer data file on said central computer in real time;

appending said combined string value into a second single computer data file for all said collections on said central computer in real time;

calculating by the one or more computer processors, a second combined string value for said plurality of respondents in all said collections by adding each individual numerical part of each said combined computer string value in said second single computer data file on said central computer in real time;

extracting by the one or more computer processors, combined first category values and combined second category values from said combined string value, representing the combined input of said plurality of respondents for each collection, on said central computer in real time;

extracting by the one or more computer processors, second combined first category values and second combined second category values from said second combined string value, representing the combined input of said plurality of respondents of all said collections, on said central computer in real time;

calculating value of the respondent's satisfaction and level of conviction further including the steps of:

defining the value of a plurality of respondent's satisfaction as the closeness of match of the ranking of said category groups from said emotional responses for all respondents combined with the ranking of said category groups from said rational responses combined, wherein an exact match indicates the highest level of satisfaction and the exact opposite indicates the lowest level of satisfaction;

ranking by the one or more computer processors, said category groups into a first combined ranking order according to said combined first category values and said category importance value on said central computer in real time;

ranking by the one or more computer processors, said category groups into a second combined ranking order according to said combined second category values on said central computer in real time;

calculating by the one or more computer processors, a numerical value for said closeness of match of said combined first ranking order with said combined second ranking order on said central computer in real time;

ranking by the one or more computer processors, said category groups into a third combined ranking order according to said second combined category values and said category importance value on said central computer in real time;

ranking by the one or more computer processors, said category groups into a fourth combined ranking order according to said second combined second category values on said central computer in real time;

calculating by the one or more computer processors, a second numerical value for said closeness of match of said third combined ranking order with said fourth combined ranking order on said central computer in real time, representing the satisfaction level for all said collections;

defining by the one or more computer processors, said plurality of respondent's level of conviction as the sum of the absolute combined category values resulting from said emotional responses and said rational responses of all respondents, wherein a larger resulting value shows a greater level of conviction than a smaller resulting value;

calculating by the one or more computer processors, a third numerical value for said plurality of respondent's level of conviction based upon said combined first category values and said combined second category values on said central computer in real time;

calculating by the one or more computer processors, a fourth numerical value for all said collections of said plurality of respondent's level of conviction based upon said second combined first category values and said second combined second category values on said central computer in real time;

presenting said numerical value of said plurality of respondent's satisfaction, said second numerical value of all said collections of said plurality of respondent's satisfaction, said third numerical value of said plurality of respondent's level of conviction and said fourth numerical value of all said collections of said plurality of respondent's level of conviction to said survey initiator in real time, on said display of said standalone computer.

14. The method according to claim 13 of presenting the results from said questionnaire survey both textually and graphically on an output device, so that said survey initiator sees both a summary of their own said entity's results for satisfaction and level of conviction as well as the results of a plurality of entities, thereby allowing entity benchmarking immediately following completion of said questionnaire survey by said survey initiator's entity.

* * * * *